US010551483B2

(12) United States Patent
Wyatt

(10) Patent No.: US 10,551,483 B2
(45) Date of Patent: Feb. 4, 2020

(54) METHOD AND SYSTEM FOR PERSONAL AREA RADAR

(71) Applicant: Harris Corporation, Melbourne, FL (US)

(72) Inventor: Michael Wyatt, Clearwater, FL (US)

(73) Assignee: Harris Corporation, Melbourne, FL (US)

( * ) Notice: Subject to any disclaimer, the term of this patent is extended or adjusted under 35 U.S.C. 154(b) by 423 days.

(21) Appl. No.: 15/078,531

(22) Filed: Mar. 23, 2016

(65) Prior Publication Data

US 2017/0242097 A1    Aug. 24, 2017

Related U.S. Application Data

(60) Provisional application No. 62/236,011, filed on Oct. 1, 2015.

(51) Int. Cl.
*G01S 7/24* (2006.01)
*G02B 27/01* (2006.01)
(Continued)

(52) U.S. Cl.
CPC .................. *G01S 7/24* (2013.01); *G01S 7/41* (2013.01); *G01S 13/0209* (2013.01);
(Continued)

(58) Field of Classification Search
CPC ... G01S 7/24; G01S 13/89; G01S 7/41; G01S 13/865; G01S 13/867; G01S 13/0209; G01S 2013/0254; G01S 13/887; G01S 3/30; G01S 13/781; G01S 13/88; G02B 23/125; G02B 27/0189; G02B 27/0141; A42B 1/06;
(Continued)

(56) References Cited

U.S. PATENT DOCUMENTS 3,383,682 A * 5/1968 Stephens, Jr. ........... G01S 13/88
342/24
4,145,690 A * 3/1979 Petitjean et al. ...... G01S 13/781
343/6.5 R
(Continued)

FOREIGN PATENT DOCUMENTS

WO    WO2011/080688 A2 *  7/2011  ........... G01S 13/887

*Primary Examiner* — Bernarr E Gregory
(74) *Attorney, Agent, or Firm* — Davidson Berquest Jackson & Gowdey, LLP

(57) ABSTRACT

A personal area radar is provided to permit a user to be aware of their surroundings. This may be in 360 degrees or any other suitable coverage area and angle. The personal area radar can show objects to the user through fog, smoke, precipitation, darkness and with full 360 degree field of view capability, significantly improving the user's overall situational awareness. They may also be used to view things that are behind solid objects such as in or behind walls or underground. These systems may be highly integrated phased array radar systems mounted on a helmet. They may use small, high frequency radars able to detect solid objects (and/or semi-solid objects) such as people, improvised explosive devices (IED), or other solid objects. These methods and systems may provide the user with 360 degrees view and awareness of objects regardless of external conditions such as weather, darkness or other obstructions.

30 Claims, 7 Drawing Sheets

(51) Int. Cl.
*G01S 13/89* (2006.01)
*G02B 23/12* (2006.01)
*G01S 7/41* (2006.01)
*G01S 13/88* (2006.01)
*G01S 13/86* (2006.01)
*G01S 13/02* (2006.01)
G01S 13/00 (2006.01)

(52) U.S. Cl.
CPC .......... *G01S 13/867* (2013.01); *G01S 13/885* (2013.01); *G01S 13/89* (2013.01); *G02B 23/125* (2013.01); *G02B 27/017* (2013.01); *G02B 27/0172* (2013.01); *G02B 27/0189* (2013.01); *G01S 2013/0254* (2013.01); *G02B 2027/014* (2013.01); *G02B 2027/0138* (2013.01); *G02B 2027/0141* (2013.01)

(58) Field of Classification Search
CPC .......... A42B 3/046; A42B 3/30; A61H 3/061; H04N 9/04
See application file for complete search history.

(56) References Cited

U.S. PATENT DOCUMENTS

| | | | | |
|---|---|---|---|---|
| 4,468,101 | A * | 8/1984 | Ellis | G02B 23/125 |
| 5,818,381 | A * | 10/1998 | Williams | A61H 3/061 |
| 8,510,869 | B1 * | 8/2013 | McCrady et al. | A42B 1/06 |
| 8,836,793 | B1 * | 9/2014 | Kriesel et al. | H04N 9/045 |
| | | | | 348/164 |
| 8,947,195 | B1 * | 2/2015 | Anvari | A42B 3/046 |
| 9,007,217 | B1 * | 4/2015 | Anvari | A42B 3/30 |
| 9,086,472 | B2 * | 7/2015 | Ivtsenkov et al. | G01S 3/30 |
| 2012/0256779 | A1 * | 10/2012 | Nguyen et al. | G01S 13/887 |
| 2015/0346820 | A1 * | 12/2015 | Poupyrev et al. | G01S 13/89 |

\* cited by examiner

METHOD AND SYSTEM FOR PERSONAL AREA RADAR

RELATED APPLICATION

This application claims the benefit of provisional patent application Ser. No. 62/236,011 filed Oct. 1, 2015, which is incorporated by reference herein.

FIELD OF THE INVENTION

This generally relates to radar systems, and more particularly to a personal area radar system.

BACKGROUND

Soldiers and other personnel often use night vision technology to see in low-light conditions. Night vision technology, which uses light amplification sometimes blended with infrared technology, provides the user with the ability to see in low-light conditions but provides little to no benefit in fog, smoke or precipitation, and has a limited field of view. With night vision technology, a user does not see what is in front of them in certain conditions, nor what is to the side or behind them in any condition. This limits the effectiveness and can be detrimental and potentially hazardous, depending on the situation and the use.

In addition to night vision goggles, conventional systems include handheld radar that can penetrate walls to scan for items placed in walls, made by for example Time Domain, Inc., for example. However, these systems require a separate, dedicated radar that is not integrated with the goggle display and has limited peripheral coverage.

Accordingly, there is a desire to avoid these and other related problems.

SUMMARY

In accordance with the present invention, a personal area radar system mounted on a helmet is provided, comprising one or more radar antennas on the helmet configured to transmit a radar signal and receive the radar signal when returned from reflection off an object, and a processor configured to process the received returned radar signal received from the one or more radar antennas to determine the location of the object. The personal area radar system also comprises a display configured to display an indication of the location of the object to a user wearing the helmet based on the determined location of the object.

A multi-directional personal area radar system for personal use is provided, comprising a plurality of radar antennas worn by a user, positioned in multiple directions and configured to transmit a radar signals and receive the radar signals when returned from reflection off an object. The multi-directional personal area radar system further comprises a processor configured to process the received returned radar signals received from the plurality of radar antennas to determine the location of the object, and a display configured to display an indication of the location of the object to the user based on the determined location of the object.

A method in a personal area radar system mounted on a helmet is provided, comprising transmitting a radar signal from a radar antenna on a helmet, and receiving the radar signal when returned from reflection off an object. The method further comprises processing the received returned radar signal to determine the location of the object, and displaying an indication of the location of the object to a user wearing the helmet based on the determined location of the object.

DETAILED DESCRIPTION

Figure 1:
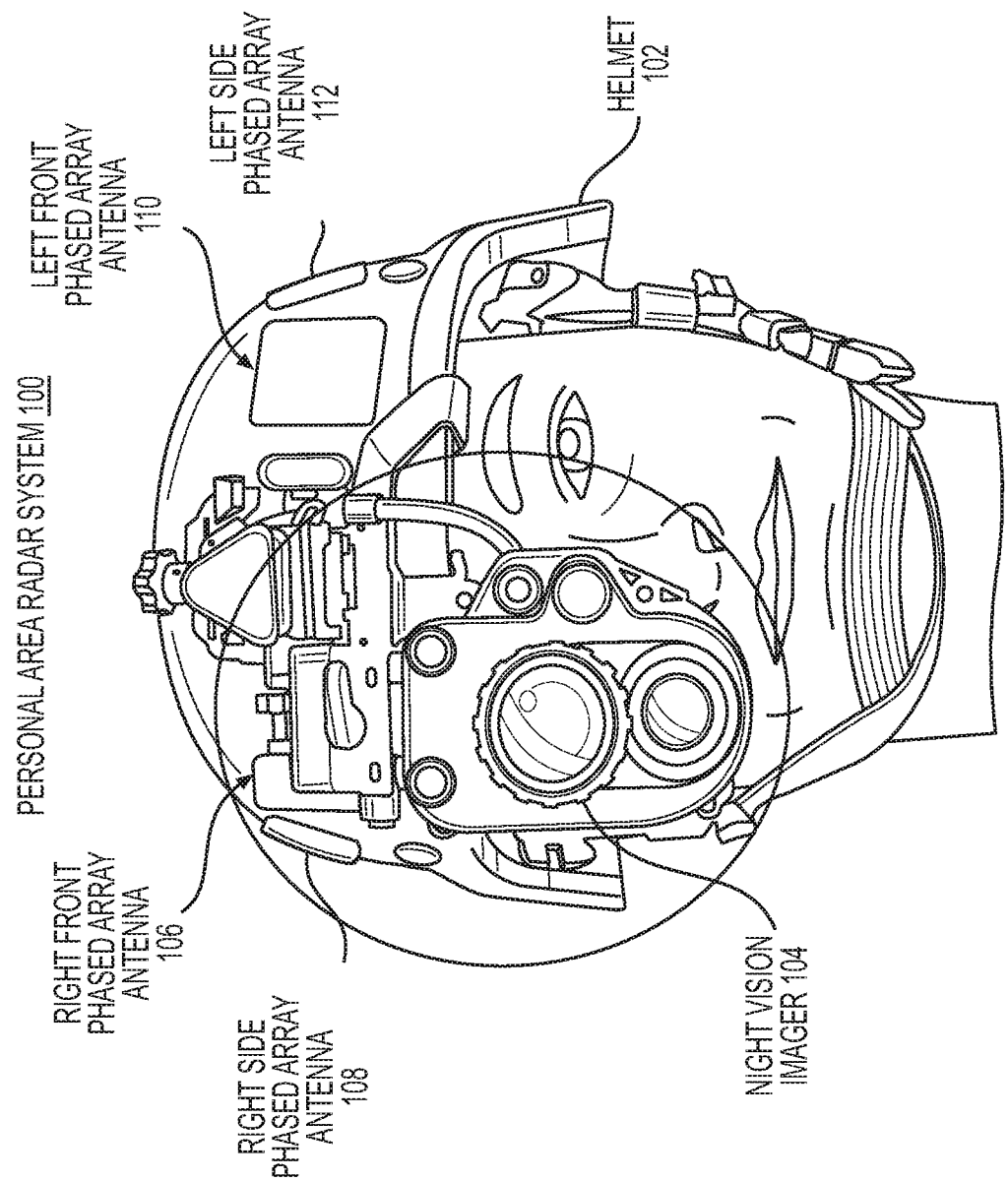
FIG. 1 depicts a front view of an exemplary personal area radar system on a helmet.

Methods and systems in accordance with the present invention provide a personal area radar which shows the location of objects and movement around the user so that a user be aware of their surroundings. This may be in 360 degrees or any other suitable coverage area and angle. This personal area radar can show objects to the user through fog, smoke, precipitation, darkness and with full 360 degree field of view capability, significantly improves the user's overall situational awareness. They may also be used to view things that are behind solid objects such as in or behind walls or underground. These systems may be highly integrated phased array radar systems mounted on a helmet, for example. They may use small, high frequency radars with the ability to detect solid objects (and/or semi-solid objects) such as people, improvised explosive devices (IED), or other solid objects. In one embodiment, these method and systems selectively enable ultra wideband (MB) radar signals tailored for through and in wall imaging, as well as underground imaging, allowing the identification of personnel, hazards and IED's, utilizing the night vision display.

These methods and systems may provide the user with 360 degrees view and awareness of objects regardless of external conditions such as weather, darkness or other obstructions. They may provide a thin conformal mounting, phased array radar antenna system integrated into the user's helmet which places a non-invasive method for inclusion of personal area radar benefits within the user's reach. They may employ advanced semiconductor and packaging technology to yield a small, thin, lightweight and power efficient phased array personal area radar system. This may be useful, for example, for soldiers or firemen or other personnel.

Indications of objects around the personal radar system are displayed on a display, such as a night vision goggle display that incorporates visual information related to the personal area radar signals. The system may allow images of the radar return to be displayed directly or as an overlay on the night vision (or other) display. In one implementation, they may create visual indicators such as flashing symbols located in the display edges, to indicate side and rear radar returns of objects and movement. Additionally, they may encrypt the radar signal to enable friend-or-foe identification by means of colored identifiers and images on the display.

Advanced CMOS and BiCMOS Silicon Germanium (SiGe) semiconductor technology has advanced to a state where entire high resolution radar systems can be integrated to levels allowing applications such as personal area radar for field use. Electronically scanned high-resolution radar images can be created from an advanced, surface-mounted, thin phased array personal area radar system conformal mounted into a field helmet. In one embodiment, display of the radar signals leverages standard issue night vision goggles and supplements a night vision image or as a standalone radar image on the goggle by selection.

Several phased array antennas may be located around the helmet. Locating several phased array antennal elements around the helmet perimeter allows for an enhanced field of view and improves the user's situational awareness. Processing the side-and-rear facing radar array returns for selective adaptive level target movement frees the user to concentrate on what is immediately ahead, while an alerting symbol (flashing side view) appears in the night vision display should side-or-rear target presence or movement be detected. The user then can turn and face the target area for a detailed radar image of the alerting area. In another implementation, the radar elements may be located elsewhere besides the helmet, on the body for example.

Radar array scanning is electronic using active beam forming and steering to achieve a narrow beamwidth with low sidelobes, while allowing a scanned vertical field of 45 degrees and a scanned horizontal 120 degree field, for example, although other scanned fields are possible. Coherent detection allows multiple personal area radars to operate in the same vicinity without interference. In one implementation, range for the personal area radar is limited by design to provide returns from 1000 feet or less, allowing low power emissions to conserve battery power and maintain a low probability of detection.

Selective encryption in the transmitted radar signal provides friend-or-foe identification in battlefield scenarios, further enhancing the user's situational awareness and safety. Colored indicators (green and red, for example) identify the target status and alert the user to potential adversaries. These colored indicators may be the same as used for motion detection from side and rear radar signals and the radar image color for forward looking radar signals.

The personal area radar may be a programmable type of radar, and the waveform can be tailored for application for seeing through solid objects. As mentioned above, it may use UWB for wall penetration and/or ground penetration to look into a wall, revealing objects inside, or look beneath the ground to detect IED's. These systems can be configured to handle different wavelength (e.g., longer wave lengths, or high frequencies and shorter wavelengths). The array can be configured to handle different wavelengths within the limits of the array size.

FIG. 1 depicts a front view of an exemplary personal area radar system 100. An exemplary user is shown wearing helmet 102. The helmet 102 is equipped with night vision imager 104 which provides night vision through low light amplification and/or infrared enhancement. The personal area radar system includes right front phased array antenna 106, right side phased array antenna 108, left front phased array antenna 110, left side phased array antenna 112. The rear phased array antenna 114 is not shown on this Figure, but is shown below on FIG. 2. These phased array antennas are radar components that emit signals and then evaluate its reflected signal when it returns. Through this process, it can determine the distance to a solid object. In one implementation, the wavelengths used are short wavelengths to detect solid objects of varying size. These components may be a phased array radar system comprised of multiple individual antenna elements. However, they are relatively small individual radar antenna arrays that may be mounted, for example, on a helmet for personal use.

These phased array radars may also be directional electronically phased array radars that can scan without any movement. They control phase and amplitude on each element to steer the beam and can steer both horizontally and vertically.

Different wavelengths dictate what is detected, range and what is shown. For example, in one extreme example, large marine radar with long wavelengths, e.g., 10 GHz frequency, used for detecting larger objects at long distances are used in maritime applications, and the radar antennas are relatively large. In contrast, personal area radar may typically use shorter wavelengths to detect smaller objects at shorter distances, to provide higher resolution for detection of solid objects, and may use smaller antennas. The type of radar used and the radar waveform determines what is shown and can be varied or selected for particular purposes. All of the radar methods can detect motion, but some allow penetration of concrete walls and drywalls. There are also some wavelengths that do not propagate through foliage. Phased array antennas can be combined to allow use of longer wavelengths, or can be separated at the higher wavelengths to achieve better resolution. The different wavelengths allow different detection of objects and environment, and may be configurable. Many different technologies for radar may be used including CMOS, BiCMOS and III-V Compound Semiconductors (e.g., indium phosphide and gallium nitride).

Figure 2:
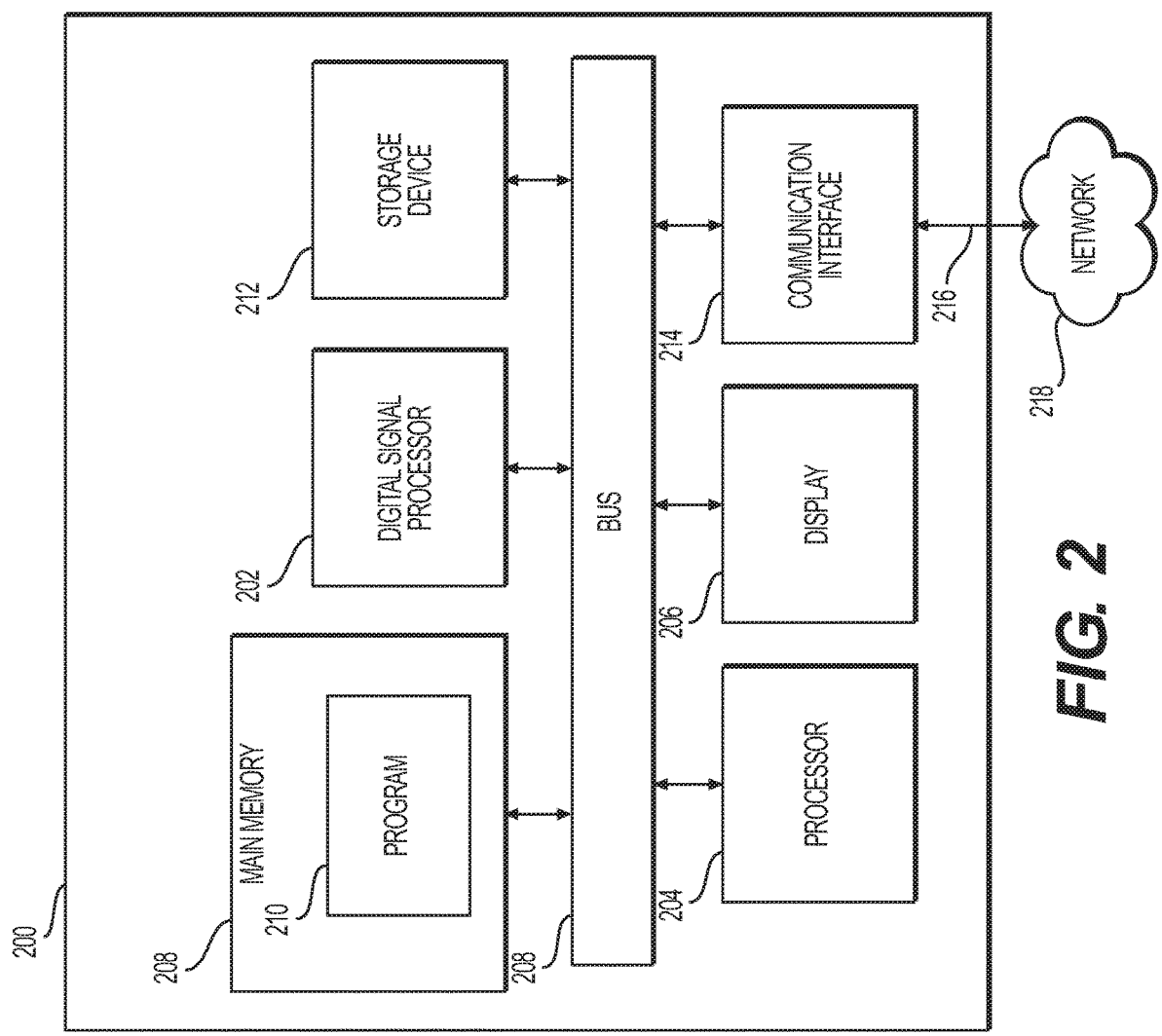
FIG. 2 illustrates an exemplary computer that operates and implements the processing of the personal area radar system 100.

FIG. 2 illustrates an exemplary computer 200 that operates and implements the processing of the personal area radar system 100. The computer 200 may be implemented on the helmet 102 or stored elsewhere, such as a mobile device attached to a belt or any other suitable place. The computer 200 may be small enough to implemented on the helmet and may be implemented with integrated circuits. The phased array antennas 106-114 send their signals to a digital signal processor 202 for interpretation and processing for display. The processor 204 similarly controls the transmission and reception of the radar signals from the phased array antennas 106-114. The processor 204 performs digital processing to combine the incoming signals and transform them into a displayable for format on display 206. In one implementation, the digital signal processor 202 may be part of the main processor 204 for a simpler implementation. However, having separate processors 202 and 204 as shown may be preferred since each can be optimized for its intended workload and function.

Computer 200 also includes a display 206, which may be the display that the user uses to view night vision imagery. The display 206 may be shown in front of one or both eyes of the user, or located elsewhere, such as a mobile device and/or remote station. In addition to the display 206, there may also be a control interface (not shown), in which the user may operate the personal area radar system. This control interface may be implemented in any suitable way, such as a button or buttons, touch screen or voice recognition.

Because the radar signals are coded signals that are created digitally, they can be encrypted. The radar may serve as a friend or foe identifier, to other personal area radar systems 100 that are authorized, and may use encryption in doing so. To do so, the radar signal emitted could be received by another personal area radar system 100 which could respond with another signal to identify as a friend.

Computer 200 includes a bus 208 or other communication mechanism for communicating information, and a processor 204 coupled with bus 208 for processing the information. Computer 200 also includes a main memory 208, such as a random access memory (RAM) or other dynamic storage device, coupled to bus 208 for storing information and instructions to be executed by processor 204. In addition, main memory 208 may be used for storing temporary variables or other intermediate information during execution of instructions to be executed by processor 204. Main memory 208 includes a program 210 for implementing the personal area radar system 100 in accordance methods and systems consistent with the present invention. Alternatively, the procedures for implementing the system may be hardwired, for example, in a chip. Computer 200 also includes a digital signal processor 202 for processing signals received by the radar antennas 106-114. Computer 200 may also include a read only memory (ROM) or other static storage device coupled to bus 208 for storing static information and instructions for processor 204. A storage device 212 may be provided and coupled to bus 208 for storing information and instructions.

According to one embodiment, processor 204 executes one or more sequences of one or more instructions contained in main memory 208. Such instructions may be read into main memory 208 from another computer-readable medium, such as storage device 212. Execution of the sequences of instructions in main memory 208 causes processor 204 to perform the process steps described herein. One or more processors in a multi-processing arrangement may also be employed to execute the sequences of instructions contained in main memory 208. In alternative embodiments, hardwired circuitry may be used in place of or in combination with software instructions. Thus, embodiments are not limited to any specific combination of hardware circuitry and software.

Although described relative to main memory 208 and storage device 212, instructions and other aspects of methods and systems consistent with the present invention may reside on another computer-readable medium, either now known or later discovered.

Computer 200 also includes a communication interface 214 coupled to bus 208. Communication interface 214 provides a two-way data communication coupling to a network link 216 that may be connected to a network 218, such as the Internet or other computer network. Wireless links may also be implemented. In any such implementation, communication interface 214 sends and receives signals that carry digital data streams representing various types of information.

Figure 3:
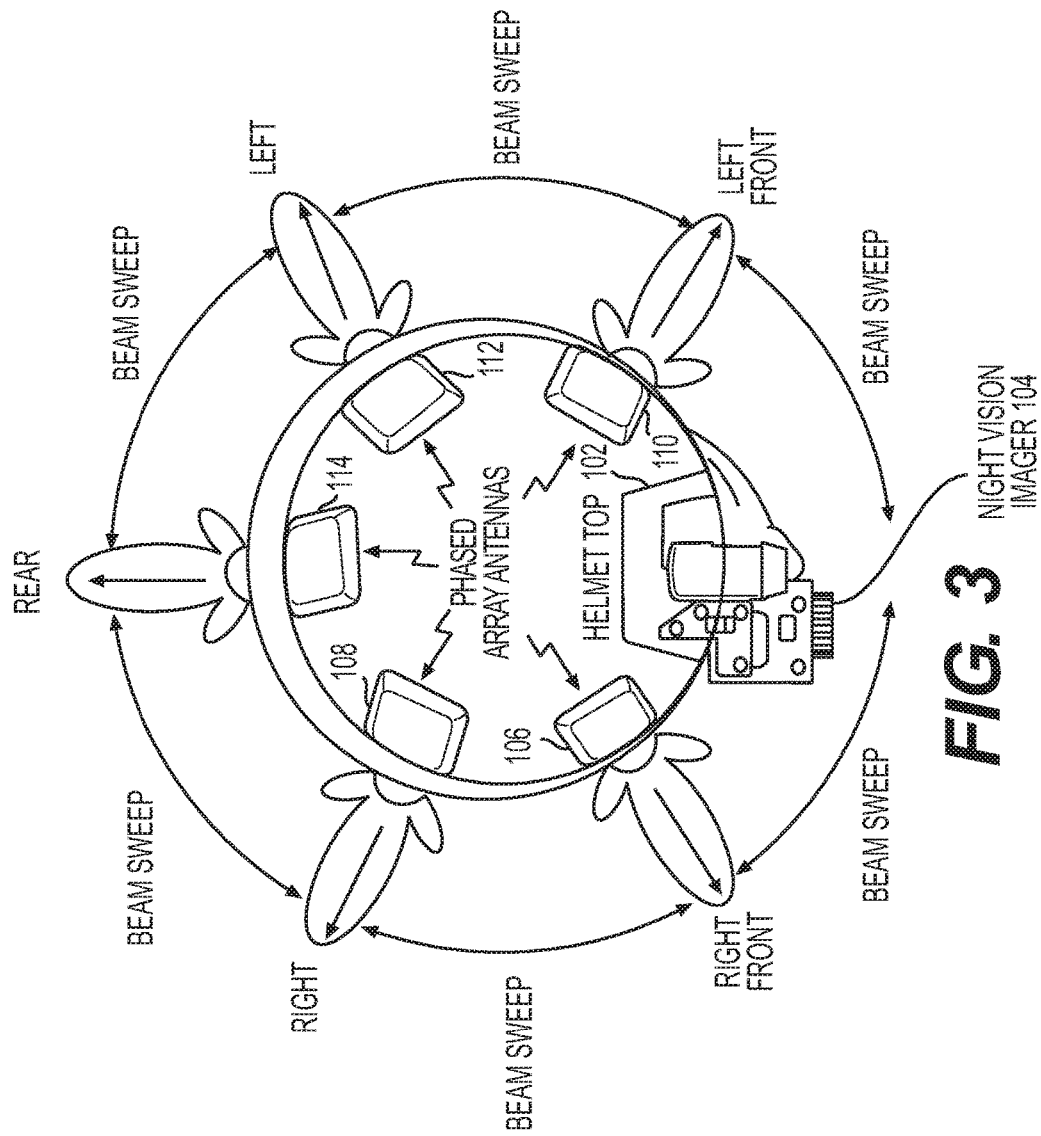
FIG. 3 shows a view from the top of an exemplary personal area radar system 100.

FIG. 3 shows a view from the top of an exemplary personal area radar system 100. In this Figure, the elements of FIG. 1 are shown but also including rear phased array antenna 114, which may be used to alert the user to behavior behind them. FIG. 3 also shows the radar beam sweep of each phased array antenna 106-114. In one implementation, the beam sweep is 120 degrees left and right for each phased array antenna 106-114. The beam sweep also goes up and also goes up and down, as shown on FIG. 3. In one implementation, the vertical beam sweep goes up and down 45 degrees, whereas there may not be as much interest in looking overhead.

Figure 4:
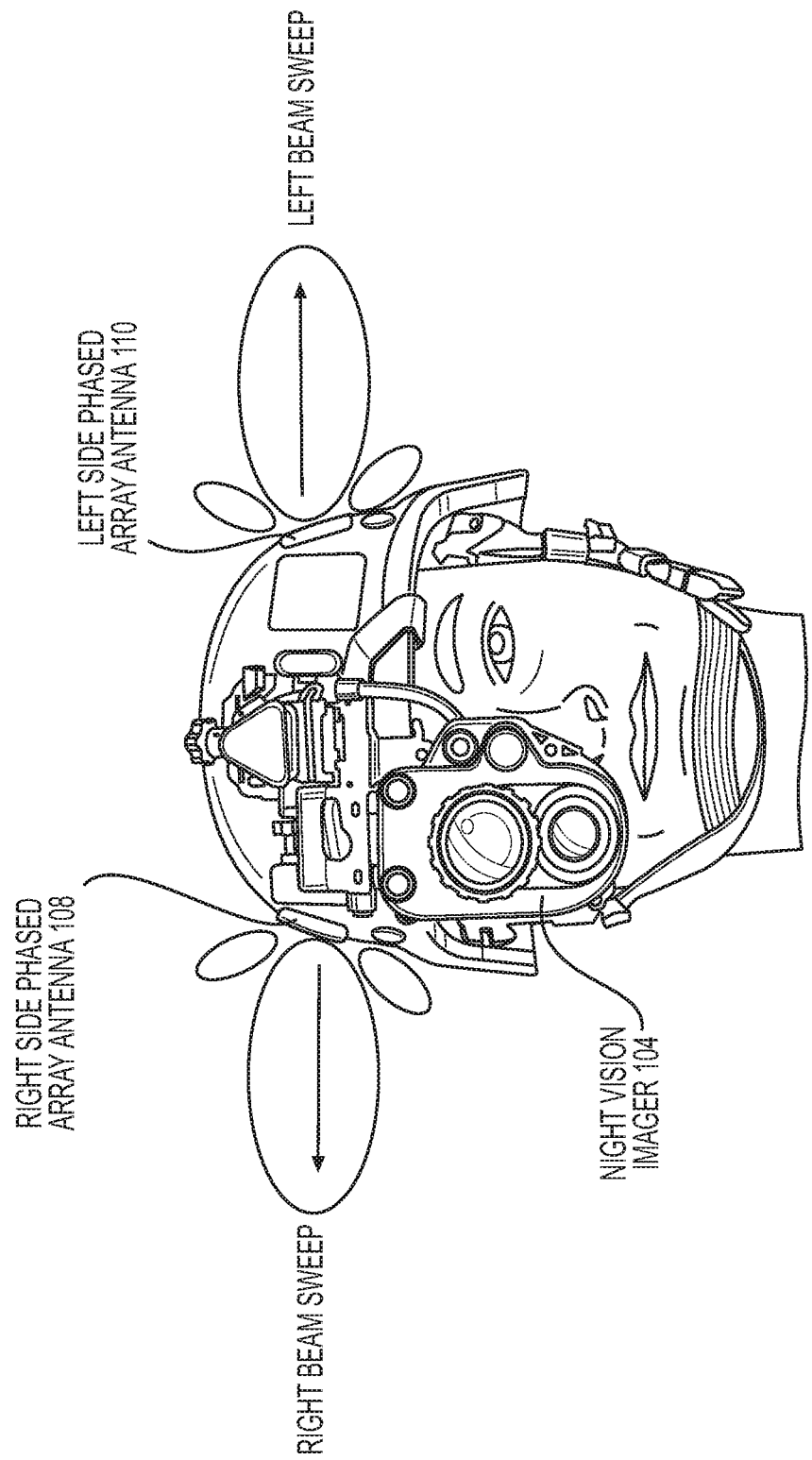
FIG. 4 shows the front view of the personal area radar system 100 including left and right radar beam sweeps.

FIG. 4 shows the front view of the personal area radar system 100, similar to FIG. 1, but also includes the right and left beam sweeps for right side phased array antenna 108 and left side phased array antenna 112. As shown, the right and left beam sweeps go vertically as well as side-to-side from the phased array antenna 108 and 110. The other phased array elements 106, 110, 114 have similar radar beam sweeps (not shown).

Figure 5:
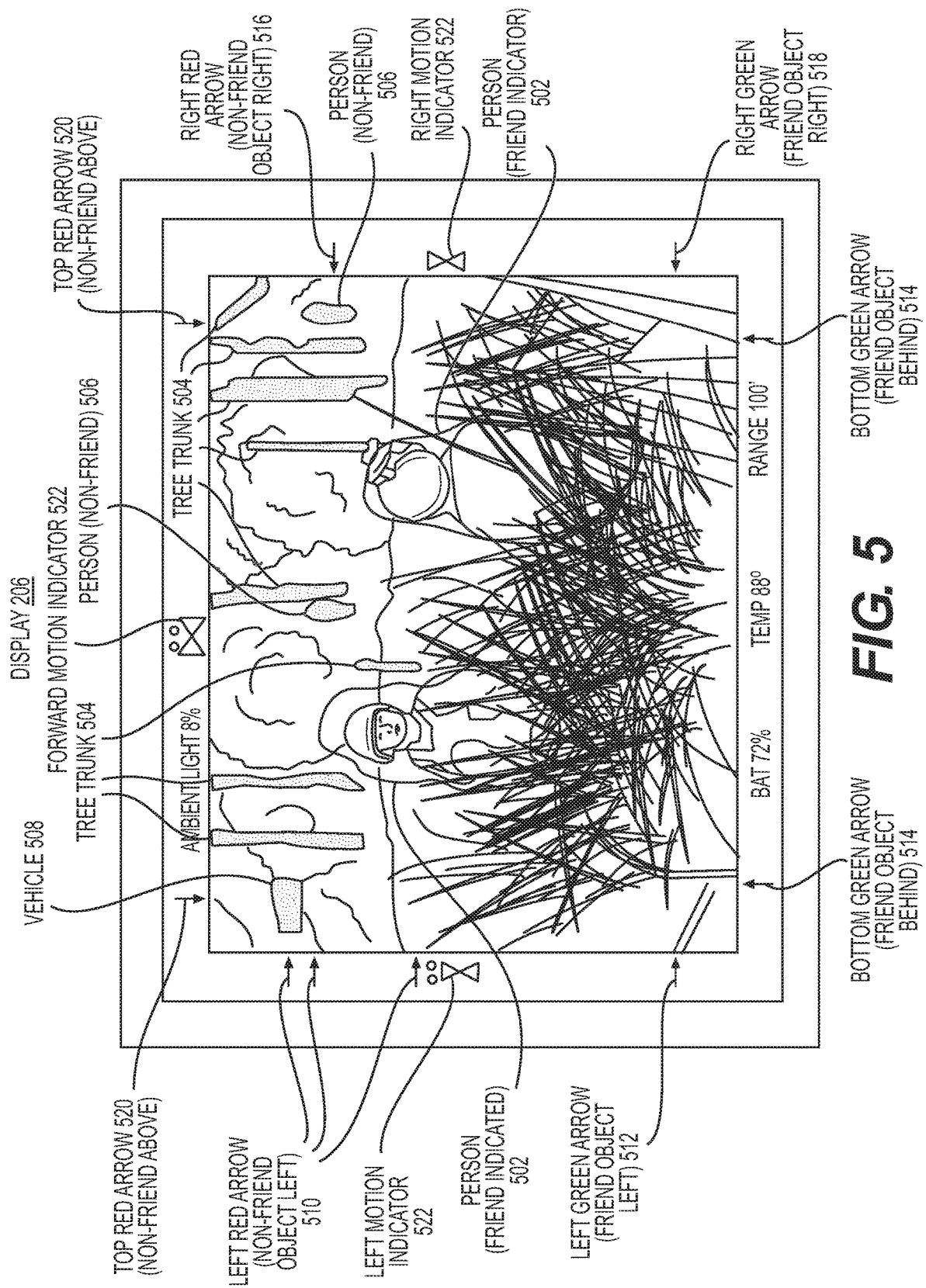
FIG. 5 shows an exemplary user's view through the display when using an exemplary personal area radar system.

FIG. 5 shows an exemplary user's (e.g., a soldier's) view through the display 106 when using an exemplary personal area radar system 100. The display 206 shows the radar signals to the user, which may be incorporated into night vision goggles and displayed digitally. In FIG. 5, the user is viewing a night scene through the personal area radar system 100 with tall grass, two friend objects 502 (people), and eleven non-friend objects amongst trees. As displayed by the personal area radar system 100, the two friend objects 502 are soldiers having systems identifying themselves as friends to the user's personal area radar system.

Although not shown colored on the Figure, these two friend objects 502 may be colored and highlighted in green, for example, thereby identifying them clearly for the user. In contrast, the non-friend objects may be colored and highlighted in red, for example. Eight of the eleven non-friend objects are tree trunks 504 (represented as long straight red images), and two of them 506 (center and right side) are people (e.g., potential enemy soldiers), and one (on the far left side) is a vehicle 508. These solid objects are identified to the personal area radar system 100 as being solid objects, but not having a friend identifier. As the objects move, they will be remain highlighted and identified clearly for the user, even if they would not otherwise be readily seen with or without night vision.

The edges of the display 206 may also provide additional information, such as ambient light percentage, battery life percentage, temperature, mode indication, range to an object or objective, or any other suitable information. They may also include arrows indicating where friends or foes are that are out of the user's field of view. For example, on the left side, there are three red arrows 510 and one green arrow 512. This indicates three non-friendly objects to the left outside of the user's field of view, and one friendly object to the left outside of the user's field of view. There are similarly two green arrows 514 at the bottom, which indicate two friendly objects behind the user. On the right side, there is one red arrow 516 and one green arrow 518 indicating one friendly object and one non-friendly object to the right side outside of the user's field of view. At the top, there are two red arrows 520 indicating two objects above the user's field of view. The motion indicators 522 on the left, right and top of the display may indicate motion to the left, right and in front of the user. There may also be a motion indictor at the bottom (not shown) to indicate motion behind the user. The motion indicators may be colored green or red, for example, to indicate motion of a friendly or non-friendly object. Other information than shown may also be indicated on the display 206.

Figure 6:
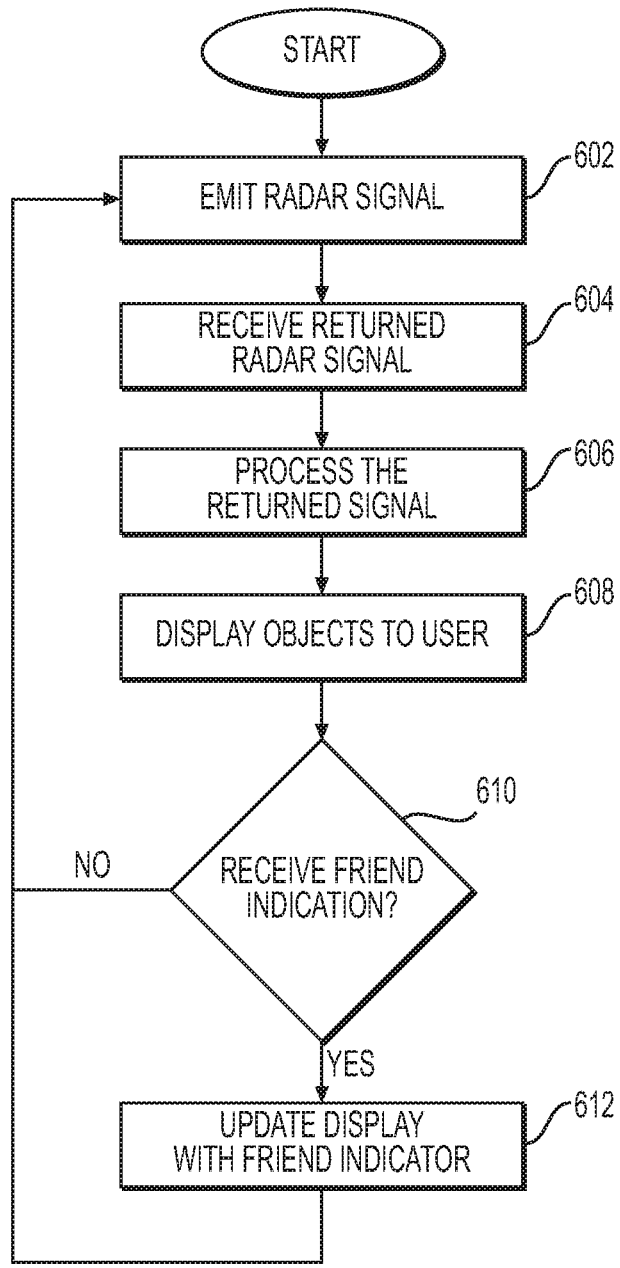
FIG. 6 is the flowchart showing the operation of the personal area radar system 100

FIG. 6 is the flowchart showing the operation of the personal area radar system 100. The system 100 emits radar signals from the phased array antennas 106-114 (step 602), and receives the return signals that have been reflected by solid objects (step 604). The digital signal processor 202 then processes the returned signals (step 606), and displays the locations of solid objects to the user on the display 206 (step 608) based on the processed returned signals. The system may also receive a friend indication signal from another authorized (step 610), and updates the display 206 accordingly (step 612). The personal area radar system 100 repeats the emission of radar signals and receiving the return signals reflected by solid objects and continually updates the display accordingly.

Figure 7:
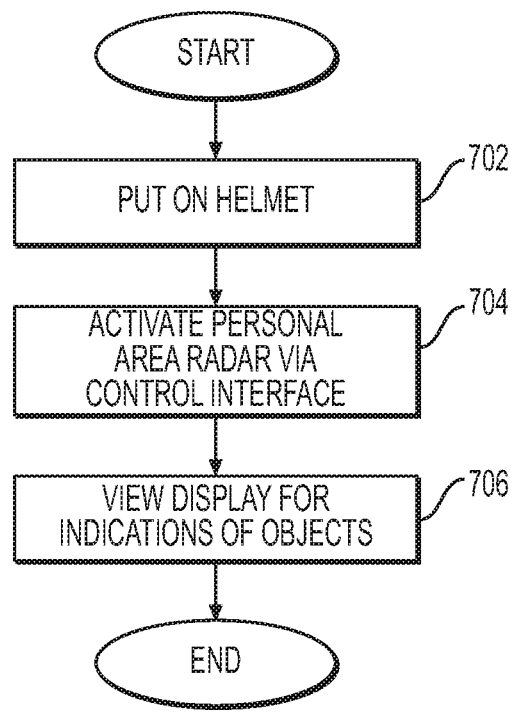
FIG. 7 is a flowchart showing the steps of a user using the personal area radar system 100.

FIG. 7 is a flowchart showing the steps of a user using the personal area radar system 100. The user puts on the helmet (step 702), and activates the personal area radar system 100 via the control interface (step 704). The user may then view into or through the display 206 to see indications of the locations of solid objects and potentially motion. These indications of objects and motions may also be in a 360 degree field, and may be to the right, left, above, below and behind the user.

The foregoing description of various embodiments provides illustration and description, but is not intended to be exhaustive or to limit to the precise form disclosed. Modifications and variations are possible in light of the above teachings or may be acquired from practice. It is to be understood that the invention is intended to cover various modifications and equivalent arrangements included within the spirit and scope of the appended claims.

What is claimed is:

1. A personal area radar system mounted on a helmet, comprising:
    one or more radar antennas on the helmet configured to transmit a radar signal and receive the radar signal when returned from reflection off an object outside a field of view of a user wearing the helmet;
    a processor configured to process the received returned radar signal received from the one or more radar antennas to determine a location of the object; and
    a display configured to display an indication of the location of the object to a user wearing the helmet based on the determined location of the object outside the field of view of the user wearing the helmet.

2. The personal area radar system of claim 1, further comprising:
    a plurality of radar antennas oriented in multiple directions on the helmet and configured to transmit radar signals and receive the radar signals when returned; and
    wherein the processor determines the location of an object in multiple directions around the helmet based on one or more of the received returned radar signals, and
    the display is configured to display indications of the objects based on the determined location of the object.

3. The personal area radar system of claim 2, further comprising a radar antenna on the back of the helmet configured to detect an object behind the helmet.

4. The personal area radar system of claim 2, further comprising one or more radar antennas on the one or more of: (1) a right side of the helmet, (2) a left side of the helmet, (3) a front left side of the helmet and (4) a front right side of the helmet.

5. The personal area radar system of claim 1, further comprising a night vision imager configured to receive night vision imaging; and
    wherein the display displays the night vision imaging and the location of the object.

6. The personal area radar system of claim 1, wherein the processor is configured to receive a friend-or-foe signal; and
    wherein the display is configured to display an indication of the friend-or-foe signal.

7. The personal area radar system of claim 6, wherein the radar signal is encrypted for friend-or-foe identification.

8. The personal area radar system of claim 1, wherein the one or more radar antennas on the helmet are configured to transmit a radar signal that can penetrate solid objects; and
    wherein the display is further configured to display an indication of the location of the object when it is behind one of the solid objects penetrated by the radar signal.

9. The personal area radar system of claim 8, wherein the radar signal is an ultra wideband signal.

10. The personal area radar system of claim 8, wherein one or more of the penetrated solid objects is one of: (1) a wall and (2) the ground.

11. A multi-directional personal area radar system for personal use, comprising:
    a plurality of radar antennas worn by a user, positioned in multiple directions and configured to transmit radar signals and receive the radar signals when returned from reflection off an object outside a field of view of a user wearing the helmet;
    a processor configured to process the returned radar signals received from the plurality of radar antennas to determine a location of the object; and
    a display configured to display an indication of the location of the object to the user based on the determined location of the object outside the field of view of the user wearing the helmet.

12. The multi-directional personal area radar system of claim 11, wherein the plurality of radar antennas are on an item of clothing worn by the user.

13. The multi-directional personal area radar system of claim 11, wherein the plurality of radar antennas are on the body of the user.

14. The multi-directional personal area radar system of claim 11, wherein one of the radar antennas faces behind the user to detect an object behind the user.

15. The multi-directional personal area radar system of claim 14, wherein one or more of the radar antennas faces one of: (1) a right side of the user, (2) a left side of the user, (3) a front left side of the user and (4) a front right side of the user.

16. The personal area radar system of claim 11, further comprising a night vision imager configured to receive night vision imaging; and
    wherein the display displays the night vision imaging and the location of the object.

17. The personal area radar system of claim 11, wherein the processor is configured to receive a friend-or-foe signal; and
    wherein the display is configured to display an indication of the friend-or-foe signal.

18. The personal area radar system of claim 17, wherein the radar signal is encrypted for friend-or-foe identification.

19. The personal area radar system of claim 11, wherein the one or more radar antennas are configured to transmit a radar signal that can penetrate solid objects; and
    wherein the display is further configured to display an indication of the location of the object when it is behind one of the solid objects penetrated by the radar signal.

20. The personal area radar system of claim 19, wherein the radar signal is an ultra wideband signal.

21. The personal area radar system of claim 19, wherein one or more of the penetrated solid objects is one of: (1) a wall and (2) the ground.

22. A method in a personal area radar system mounted on a helmet, comprising:
    transmitting radar signals in multiple directions from a plurality of radar antennas on the helmet to detect an object outside a field of view of a user wearing a helmet;
    receiving the radar signals when returned from reflection off the object;
    processing the received returned radar signal to determine a location of the object; and displaying an indication of the location of the object to a user wearing the helmet based on the determined location of the object outside the field of view of the user wearing the helmet.

23. The method of claim 22, further comprising transmitting a radar signal to a rear of the helmet to detect the object.

24. The method of claim 22, further comprising transmitting a radar signal to the one or more of: (1) a right side of the helmet, (2) a left side of the helmet, (3) a front left side of the helmet and (4) a front right side of the helmet, to detect the object.

25. The method of claim 22, further comprising displaying night vision imaging and the location of the object.

26. The method of claim 22, further comprising receiving a friend-or-foe signal; and
displaying an indication of the friend-or-foe signal.

27. The method of claim 26, wherein the radar signal is encrypted for friend-or-foe identification.

28. The method of claim 22, further comprising transmitting a radar signal that can penetrate solid objects; and
displaying an indication of the location of the object when it is behind one of the solid objects penetrated by the radar signal.

29. The method of claim 28, wherein the radar signal is an ultra wideband signal.

30. The method of claim 28, wherein one or more of the penetrated solid objects is one of: (1) a wall and (2) the ground.

\* \* \* \* \*